(12) United States Patent
Halter

(10) Patent No.: US 6,323,954 B1
(45) Date of Patent: Nov. 27, 2001

(54) PROCESS AND DEVICE FOR THE DETECTION OR DETERMINATION OF THE POSITION OF EDGES

(75) Inventor: Peter U. Halter, Frauenfeld (CH)

(73) Assignee: Hera Rotterdam B.V., Rotterdam (NL)

( * ) Notice: Subject to any disclaimer, the term of this patent is extended or adjusted under 35 U.S.C. 154(b) by 0 days.

(21) Appl. No.: 09/460,451

(22) Filed: Dec. 13, 1999

(30) Foreign Application Priority Data

Dec. 16, 1998 (CH) .................................................. 2489/98

(51) Int. Cl.$^7$ .................................................. G01B 11/14
(52) U.S. Cl. ........................................ 356/624; 250/559.36
(58) Field of Search ................................... 356/375, 384, 356/387, 239.1, 239.2, 429–431, 614, 615, 622, 624; 250/559.29, 559.36, 548, 223 R

(56) References Cited

U.S. PATENT DOCUMENTS

| 3,565,532 | * | 2/1971 | Heitmann et al. . | |
| 3,782,834 | * | 1/1974 | Fujimori et al. | 250/559.36 |
| 4,559,452 | * | 12/1985 | Igaki et al. | 356/386 |
| 5,115,142 | * | 5/1992 | Taguchi et al. | 250/561 |
| 5,220,177 | * | 6/1993 | Harris | 250/548 |
| 5,982,491 | * | 11/1999 | Breyer et al. | 356/375 |

FOREIGN PATENT DOCUMENTS 60-73403 * 4/1985 (JP) .

* cited by examiner

Primary Examiner—Hoa Q. Pham
(74) Attorney, Agent, or Firm—Rankin, Hill, Porter & Clark LLP

(57) ABSTRACT

For the detection of—or for the determination of the position of edges (K) of objects (G), a light source/sensor device arrangement in the manner of a light barrier is utilized, in which the light beam generated by the light source (12) is focussed to a light line (10) in an object plane (O). Foreseen furthermore are devices for the generation of a relative movement between the light beam and edges (K) to be detected or objects (G), in such a manner, that edges (K) to be detected are moved in the object plane (O) and in doing so are aligned parallel to the light line (10). In particular for the detection of edges (K) of transparent objects (G), sensor devices (11.1–11.3) in a receiving zone (B) are equipped in such a manner, that they measure not only light intensities in the area of the axis (A) of the light beam, but also intensities of light, which is deflected from the light beam by an edge (K) in the object plane (O) positioned transverse to the light line (10). By means of the optical local redundancy in the object plane (O) and/or in the receiving zone (B), a higher precision and a reduced susceptibility to errors in the detection—or in the determination of the position of edges (K) are achieved.

25 Claims, 6 Drawing Sheets

PROCESS AND DEVICE FOR THE DETECTION OR DETERMINATION OF THE POSITION OF EDGES

BACKGROUND OF THE INVENTION

The invention is in the field of sensor technology and concerns a process and a device for the detection or determination of the position of edges or of edge-like, narrow boundary surfaces of objects, particularly edges of very thin objects, such as paper or transparent foils.

It is known how to detect objects and edges of objects with light barriers (e.g., edge moves relative to the light barrier). Detection of the position of an edge or an object is also known (e.g., light barrier moves relative to the edge). For this, a light-emitting light source and a light-sensitive sensor device, which is positioned in the beam path of the emitted light, are utilized. The sensor device provides a sensor signal, which corresponds to the light intensity impinging on the sensor device. If an object is moved through the light beam between the light source and the sensor device, the intensity measured by the sensor is reduced as soon as a leading boundary surface or edge reaches the light beam. The measured intensity remains at the reduced value until a trailing boundary surface or edge of the object passes the light beam, at which moment the measured light intensity returns to its original value. The two steps in the measured intensity of the received light, for example, are interpreted as the leading and the trailing boundary surface or edge of the object moving through the light beam and are utilized for the measuring or positioning of the object. Reduced and not reduced intensity value can also be interpreted as the presence or absence, respectively, of an object in the field of the light barrier and can be correspondingly utilized.

The process of the known light barrier briefly described above is obviously only applicable for objects that are not transparent to the light beam used as the light barrier. This is, of course, valid not only for visible light, but also for other electromagnetic radiations with a wavelength suitable for a certain application.

SUMMARY OF THE INVENTION

The present invention is directed toward a process for detection or determination of the position of edges, and is based on the light barrier principle. The present invention increases accuracy and reduces the susceptibility for errors and is suitable for transparent objects.

The process according to the present invention represents a further development of the light barrier principle. The edges to be detected and the light are moved relative to one another such that every edge to be detected moves through the light in an object plane and intersects a direction of propagation of the light at an angle. At least during the passage of the edge through the light, as a minimum one intensity of the light is measured in a receiving zone. The light is focused on the object plane in at least one direction. In the object plane and/or in the receiving zone, optical local redundancy is generated.

As used herein, the term "optical local redundancy" is the presence of relevant optical signals in several places. The edge in the object plane, e.g., can be illuminated at several points. As a result of this, the process becomes more precise and less susceptible to individual local interferences on the object, such as dirt, scratches, etc. Furthermore, there can be several light sensors in the receiving zone. It is advantageous to subject the signals of the sensors to a common analysis, which leads to enhanced accuracy and reliability.

In a preferred embodiment of the invention, a light source and a sensor device are arranged such that light emitted from a light source impinges of the middle of the sensor. Between the light source/sensor device arrangement and an edge to be detected, a relative movement can be generated such that the edge can be moved through the light between light source and sensor device at a detection position and intersects the propagation axis of the light at an angle. The light is focused on the detection position into a light line that is as sharp as possible and as narrow as possible light line. The light line is aligned parallel to an edge to be detected, which passes the detection position.

Focusing devices are placed ahead of the sensor devices for the purpose of increasing the measured intensities. The focusing devices collect light diverging to a limited extent in the sensor devices and thereby increase the measured intensities.

For the detection of edges, an edge is now moved through the light at the detection position, to be precise such that, at least in the detection position, the edge is aligned parallel to the generated light line. While passing through the detection position of an edge to be detected, the intensity of a portion of the light not deflected by the edge is measured and/or the intensity of light, which is disturbed by the edge. The light disturbed by the edge is light that is deflected from the light beam by diffraction or refraction at the edge. For measurement of the undisturbed portion of light, a sensor is aligned along the main propagation direction or beam axis of the light. For measurement of the deflected portion of light, at least one sensor at a distance from the beam axis is foreseen.

The light intensities and/or combinations of intensities determined by different sensors are recorded and analyzed as a function of time or location. For example, the intensity may be compared to threshold values, whereby the time and/or the location, at which a threshold value is exceeded (or falls below), is interpreted as an edge passage or edge position. The threshold values are predetermined and correspond to the type of edge to be detected and/or to the optical characteristics of the object, which is delimited by the edge to be detected.

The intensity functions determined by the sensor devices can, on the other hand, also be exploited for the characterization of the optical characteristics of an edge or an object and for the determination of the threshold values mentioned above. If so required, the threshold values can be, simultaneously with the edge detection, adjusted for varying, external circumstances.

The device for the implementation of the process in accordance with the invention has, in the sense of a light barrier, a light source for the generation of light, sensor means in a receiving zone for measuring light intensities and means for creating relative movement between the light and the edges of objects to be detected in an object plane. The device also has means for focusing the light in at least one direction in the object plane and means for creating an optical local redundancy in the object plane and/or in the receiving zone.

A laser is advantageously foreseen as the light source while photodiodes may be used for the sensor devices. The light emitted by the light source is advantageously aimed directly at the sensor means. However, the light may be reflected and/or refracted between the light source and the sensor means. The light source also has focusing means for focusing the light in the object plane. The sensor means have a sensor aligned to the main direction of propagation or beam axis of the light and/or at least one sensor located at a distance from the beam axis. The device furthermore has means for creating relative movement between the light source/sensor means arrangement and an object with an edge to be detected such that the edge is moved through the detection position.

In further accordance with the present invention, the device preferably has means for evaluating (e.g., evaluation electronics), for recording and analyzing (e.g., comparison with threshold values) sensor signals, and for generating and transmitting signals corresponding to the results of the analysis, which, for example, can be further utilized for control purposes. The evaluating means preferably includes a microprocessor.

The process in accordance with the invention and means for implementing the process are in particular utilizable for detecting leading and/or trailing edges of transparent or non-transparent flat objects such as transparent foils and paper sheets. The objects are moved relative to the light source/sensor means arrangement such that the edges to be detected are aligned at an angle (i.e., at right angles) to the direction of movement and pass through the light beam at the same point and with the same alignment (in preference the alignment of a light line in the object plane). Paper sheets or transparent foils are carried by an also moving, transparent carrier element, which can have a transparency varying as a result of dirt or surface damage.

BRIEF DESCRIPTION OF THE DRAWINGS

The process in accordance with the invention and exemplary embodiments of the device for the implementation of the process are described in more detail on the basis of the following drawings, wherein:

FIG. 4: viewing direction parallel to the light line, resp., to one edge to be detected);

DETAILED DESCRIPTION OF THE PREFERRED EMBODIMENTS

Figure 1:
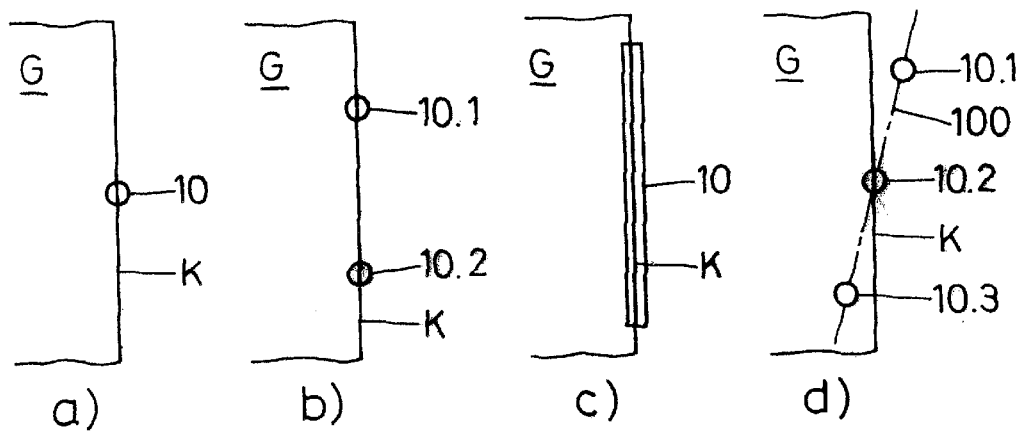
FIGS. 1a–1d illustrate various light distributions in an object plane.

In FIGS. 1a–1d various light distributions are schematically represented in an object plane. Apart from a corresponding light distribution, in each instance an object G with an edge K to be detected can be seen. In FIG. 1a, the light distribution consists of a sole light spot 10, which is created, for example, by focusing an impinging flat wave in both directions of the drawing plane. In the case of this light distribution, no optical local redundancy is present. In contrast, optical local redundancy is present in FIG. 1b, wherein two light spots 10.1, 10.2 located on the edge K are created. Also optically locally redundant is the light distribution of FIG. 1c, namely a light line 10 parallel to the edge K. The light line 10 is created, for example, by focusing an impinging local wave in a direction vertical to the edge K. Such focusing can be accomplished by means of a cylindrical lens. FIG. 1d illustrates an optically locally redundant light distribution with three light spots 10.1–10.3, which are located on a straight line 100. The straight line 100 is not parallel to the edge K. In contrast with the light distributions of the FIGS. 1b–1c, the light spots 10.1–10.3 of FIG. 1d are in general passed through or bisected by the edge K one after the other with respect to the time as the edge moves. With this, one from the local redundancy also obtains a time redundancy. The redundancy in FIG. 1d could be utilized for obtaining information about the shape of the edge K. A further light distribution, which is not illustrated, consists of a combination of the light distributions of the FIGS. 1c–1d, out of which a light line not parallel to the edge K results. Further combinations and variations are of course possible.

FIGS. 2a–2e schematically illustrate various arrangements of light sensors in a receiving zone. Apart from a corresponding sensor arrangement, in each instance an image of an object G' with an edge K' to be detected is depicted with broken lines. The arrangement of FIG. 2a contains a sole "point-shaped" light sensor 11, such as a photodiode with a surface area of typically 2×2 mm$^2$. With this arrangement, no optical local redundancy is present. Optically locally redundancy, however, is provided by the arrangement of FIG. 2b by provision of three sensors 11.1–11.3, which are arranged on a straight line 110, which is vertical to the image K of the edge. The arrangement of FIG. 2c generalizes that of FIG. 2b, in that a whole row, for example, a CCD line, of adjacent sensors 11.1, 11.2, . . . is utilized. FIG. 2d shows a further optically locally redundant arrangement of sensors 11.1–11.6. In FIG. 2e, the sensors 11.1, 11.2, . . . are arranged in a matrix, such as a CCD matrix.

In accordance with the invention, light distributions as in FIGS. 1a–1d can be combined with sensor arrangements as in FIGS. 2a–2e. An exception is the combination of the arrangement of FIG. 1a with the arrangement of FIG. 2a, because no optical local redundancy would be present in this combination. A preferred combination is that of the light distributions of FIG. 1c with the sensor arrangement of FIG. 2b, as will be discussed further hereinafter.

Figure 3:
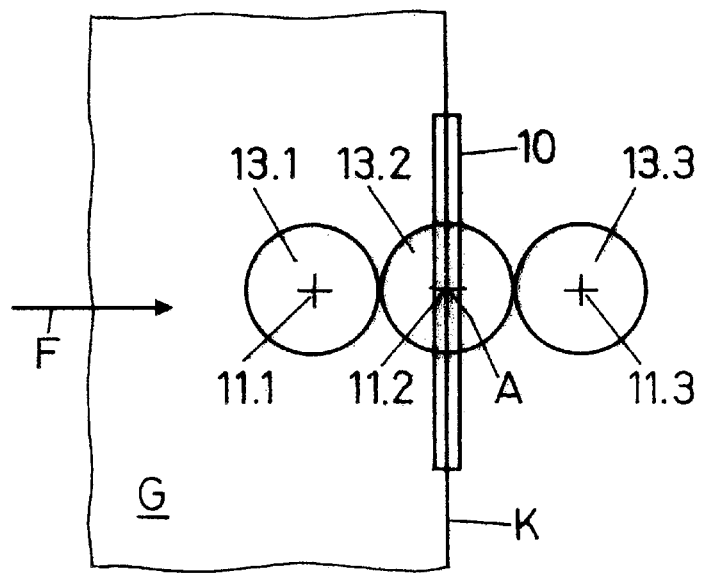
FIGS. 3 and 4 show schematic representations of the device according to the present invention, with an edge to be detected (FIG. 3: viewing direction in the direction of propagation of the light toward the sensor devices.

FIG. 3 illustrates a schematic representation of the device in accordance with the invention viewed from the light source toward the sensor devices. In simplification, it is here assumed, that the light impinges on the object plane in the form of a focused light beam with a beam axis A. FIG. 3 shows the light line 10 created by the focusing of the light beam with the beam axis A and three sensors 11.1, 11.2 and 11.3, which are arranged on a vertical line through the light line 10 and are represented as small crosses. The sensor 11.2 is located on the beam axis A and serves to measure light not disturbed by the edge. The sensors 11.1 and 11.3 are located at a distance from the beam axis A and serve to measure light deflected from the light beam by an edge to be detected. The sensors 11.1 to 11.3 are equipped with focusing devices 13.1 to 13.3 (e.g., convex lens) in order to increase the measured intensities.

FIG. 3 furthermore shows an edge K of an object G to be detected (e.g., sheet of paper or transparent foil), which edge K is positioned in the detection position. The object G, for example, is moved through the light beam in the direction of movement F such that the edge K is the leading edge.

Figure 4:
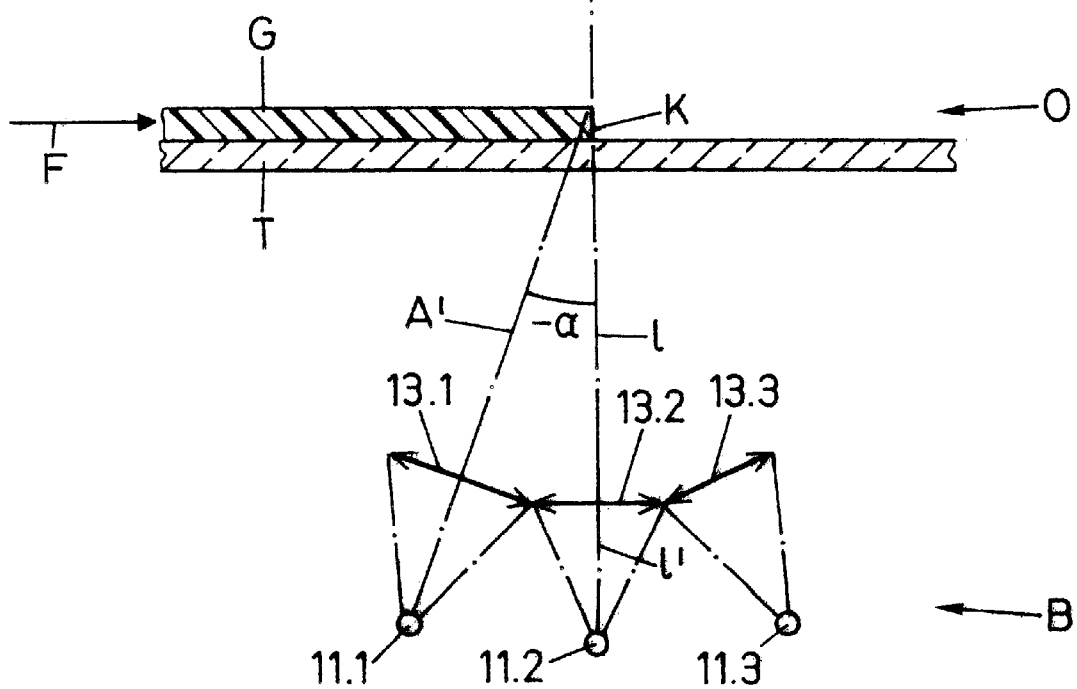

FIG. 4 illustrates the same schematic device as FIG. 3, but viewed in the direction of the edge K to be detected. The light source 12 is represented, the beam axis A of the light beam generated by the light source 12, the sensors 11.1 to 11.3 in the image area B of the focusing devices 13.1 to 13.3, which, for example, are convex lens and are designed for an object distance 1 and an image distance 1'. The light emitted by the light source can be focused on the edge K by a convex lens 14, such as a cylindrical lens. Also depicted in an object plane 0 is the object G with the edge K in detection position. The object G, for example, is moved through the light beam on a transparent carrier T, whereby the carrier moves with the object.

It is now manifest, that for the depicted position of the edge K, if this is the edge of a transparent object G, a portion of the light beam diffracted and/or refracted on the edge K and is detectable with the sensor 11.1. The sensor 11.1 is aligned with a further beam axis A', which in the detection position is deflected by an angle $-\alpha$ from the beam axis A. An edge of a transparent object extending toward the right (not illustrated) will deflect a portion of the light beam towards the sensor 11.3, which is aligned symmetrically to the sensor 11.1 to a deflection angle $+\alpha$.

FIGS. 5a–6d deal with optical conditions during edge detection, as schematically illustrated in FIGS. 3 and 4, in more detail.

Figure 5E:
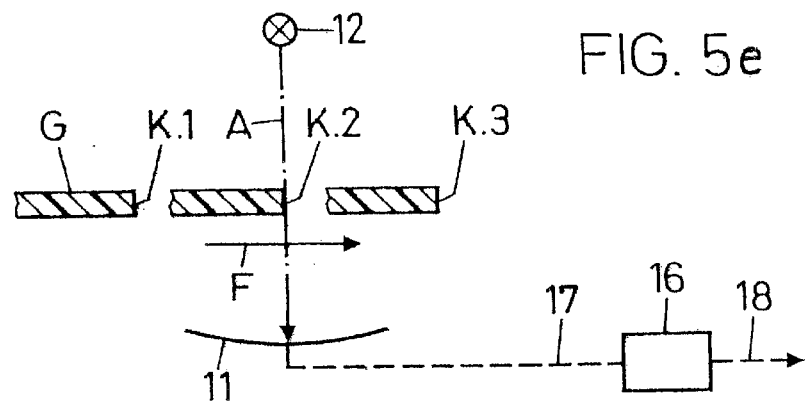
FIG. 5e illustrates an arrangement of the light source, sensor devices, and the object being moved therebetween that is discussed in conjunction with FIGS. 5a–5d.

FIG. 5e, like FIG. 4, shows an arrangement of light source 12 and sensor devices 11 and an object G moved in direction F. The leading edge of the object G is depicted in three positions K.1, K.2 and K.3. Also schematically depicted is a means of evaluation 16, which is connected with the sensor devices 11 by signal lines 17, and from which further signal lines 18 for generated signals lead off. Such a means of evaluation 16, can contain a microprocessor. It can have (not illustrated) means for entering and storing threshold values, means for the comparison of measured values and means for the variation of threshold values on the basis of measured values.

Figure 2:
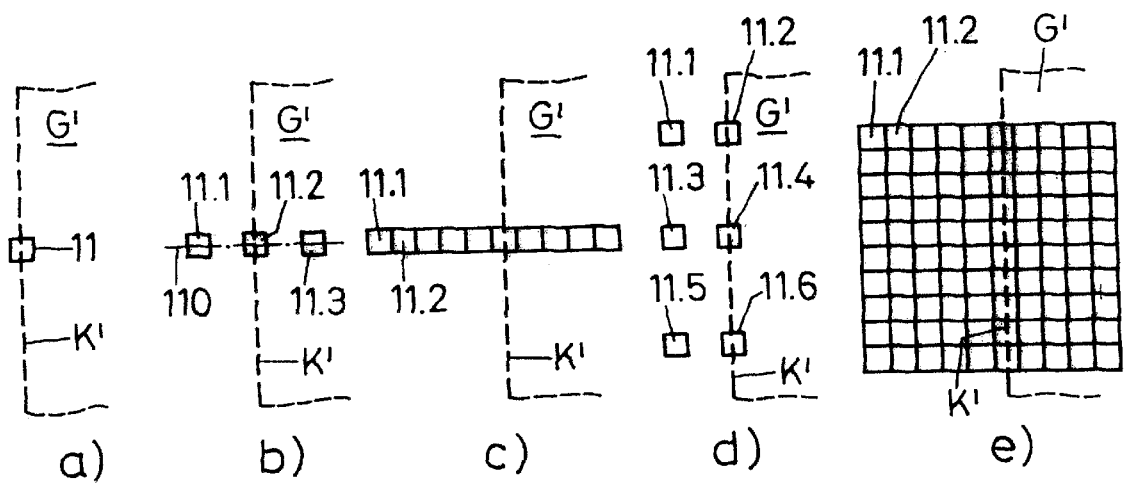
FIGS. 2a–2e illustrate various sensor arrangements in a receiving zone.

In the position K.1, the edge K has not yet reached the light beam, so that the latter impinges on the sensor devices still completely undisturbed. In the position K.2, the edge K of the object is in the range of the light beam (detection position, as illustrated in FIGS. 1 and 2. In the position K.3, the edge K has passed the light beam and the light beam impinges on the object G.

Below the schematic illustration of the light barrier arrangement and of the object G described above, now the light intensities in function of a deflection angle $-\alpha$ and $+\alpha$ from the beam axis A ($\alpha=0$) detectable by the sensor devices are represented. The intensities are in each case represented for the positions K.1, K.2 and K.3 of the edge to be detected and are respectively designated as 1, 2 and 3.

Figure 5A:
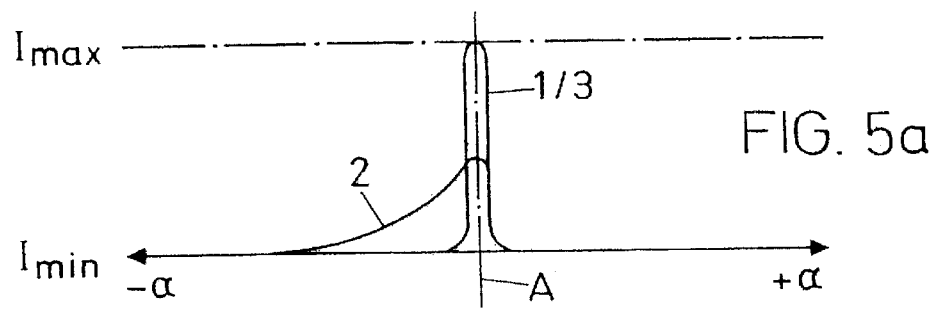
FIGS. 5a–5d illustrate the optical conditions during the passage through the detection position (FIG. 5e) of an edge to be detected as a function of the optical characteristics of the object, which is delimited by the edge.

The four cases a to d, which correspond to FIGS. 5a–5d, respectively, apply to the following conditions:

FIG. 5a (case a)—a transparent object

Figure 5B:
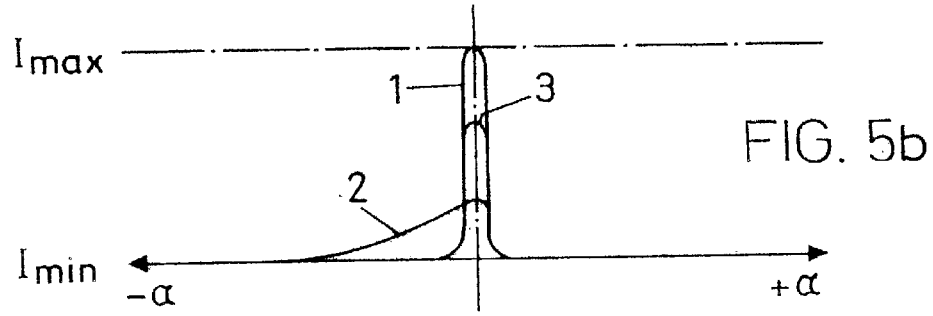

FIG. 5b (case b)—a partially transparent, partially absorbing object

Figure 5C:
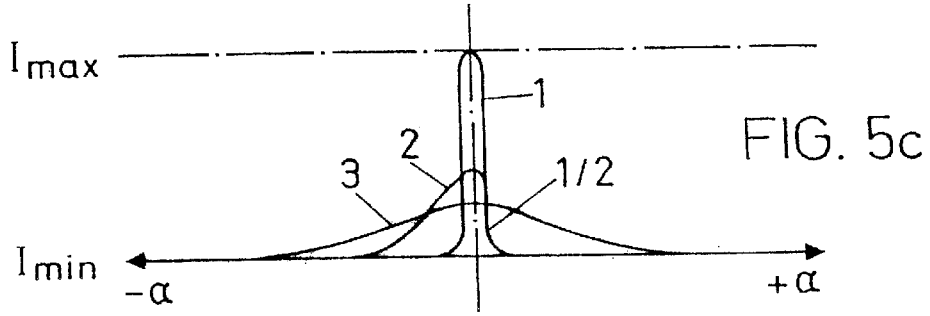

FIG. 5c (case c)—a diffusing object

Figure 5D:
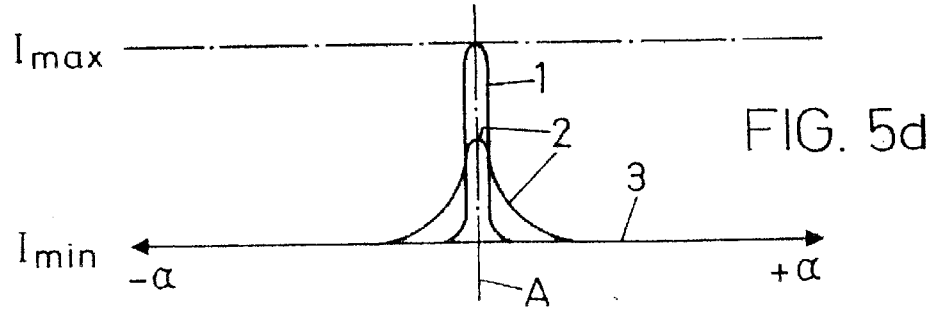
Figure 6:
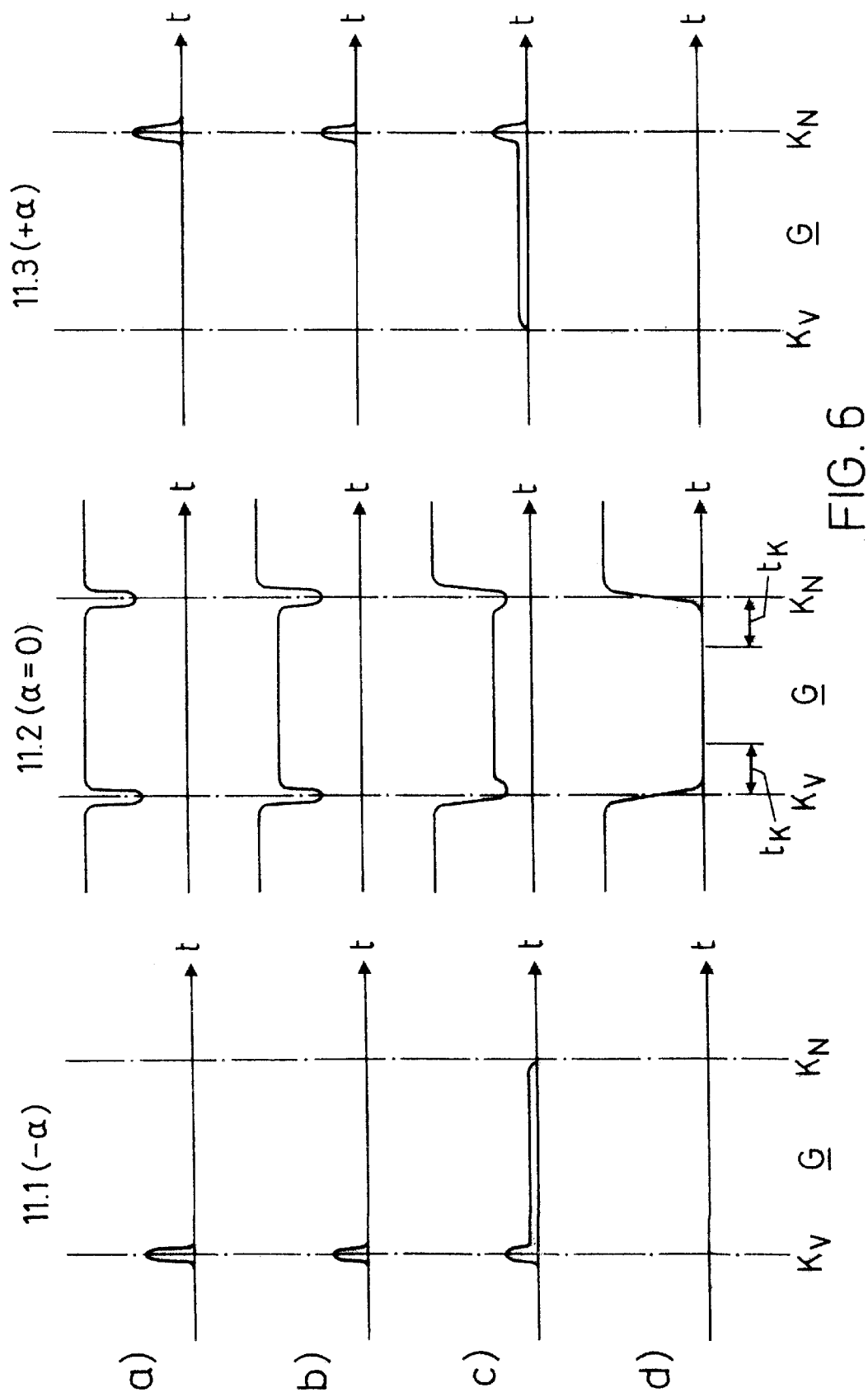
FIGS. 6a–6d illustrate intensities as a function of time during the passage through the detection position of leading and trailing edges of objects.

FIG. 5d (case d)—a completely non-transparent object

The terms "transparent", "absorbing", "diffusing" and "non-transparent" refer to the light utilized, resp., to its spectral composition.

The intensity in function of a for the position K.1 in all the aforementioned cases (a–d; FIGS. 5a–5d) is the same and represents the undisturbed light beam. As illustrated, the undisturbed light beam has a narrow width dependent on the focusing and a maximum intensity $I_{max}$.

For the position K.2, the intensity in the case of (partially) transparent objects (cases a–c; FIGS. 5a–5c) in comparison with the condition 1 is spread over a wider range of the deflection angle $\alpha$, and specifically with asymmetrically higher intensities on the side of the edge directed towards the object (negative $\alpha$-values). This phenomenon can be explained by diffraction and/or refraction of the light beam at the edge. Absorption or diffusion in the object in the cases b and c (FIGS. 5b–5c_produces a lower intensity of the deflected light compared with the case a (FIG. 5a). For a non-transparent object (case d; FIG. 5d) with an edge in the position K.2, the intensity of the beam is reduced, and only little light is deflected from the light beam (minimum intensity $I_{min}$), the same as for the edge position K.1.

For the position K.3, the light conditions for a completely transparent object (case a; FIG. 5a) in essence do not differ from the position K.1. The intensity of the undisturbed light for an absorbing (case b; FIG. 5b) and for a diffusing object (case c; FIG. 5c) is reduced compared with the position K.1. For a non-transparent object (case d; FIG. 5d) the intensity of undisturbed light is essentially equal to zero (minimum intensity $I_{min}$). For the diffusing object (case c; FIG. 5c), on both sides of the beam axis A, more diffused light is to be anticipated compared with the position K.1.

FIGS. 6a–6d correspond to the cases illustrated in FIGS. 5a–5d, but show intensity functions as a function of the time t measured by the sensors 11.1 ($-\alpha$), 11.2 ($\alpha=0$) and 11.3 ($+\alpha$). The intensities are measured when an object G with a leading edge $K_V$ and a trailing edge $K_N$ is moved through the light beam.

For a transparent object G (case a, FIG. 6a), the leading edge can be detected with the sensors 11.1 (momentary intensity increase) and 11.2 (momentary intensity reduction) (also refer to FIG. 4), the trailing edge N with the sensors 11.2 and 11.3. For increasing the sensitivity, it is advantageous to combine the changes of the signals of two sensors (11.1/11.2, resp., 11.2/11.3) for further processing (e.g., addition of increase and reduction) and to analyze them as a combination. Of object G in the FIG. 6a (case a) only the edges are detectable; the pure presence of the object G as such cannot be detected by any of the sensors.

The case with partially transparent and/or colored transparent objects (case b, FIG. 6b) differs from the aforementioned case a (FIG. 6a) by smaller deflected intensities and by the fact that the object G can be detected with the sensor 11.2 because of the absorption of light in the object. For the edge detection in the case of a milky object (case c, FIG. 6c), the same applies as for the previously described case b (FIG. 6b). As a result of the light diffusion the milky object, if necessary, can be detected by all detectors 11.1 to 11.3 by a reduction, resp., an increase of the measured intensity.

For the case of a non-transparent object (case d, FIG. 6d), the sensors 11.1 and 11.2 in essence do not detect any light the same as the sensor 11.2 also, as long as the object interrupts the light beam. The leading edge is detected by a steep reduction, the trailing edge by a steep increase of the intensity.

From FIGS. 6a–6d it is manifest that depending on the application (optical characteristics of the object, detection of leading or trailing edges) it is necessary or at least advantageous to position at least one sensor 11.1, 11.2 or 11.3, a pair of sensors 11.1/11.2 or 11.2/11.3 or three sensors 11.1/11.2/11.3 and to analyze the measured sensor signals individually or in combination. The analysis is in preference effected with a microprocessor (not shown).

In addition to the effective edge detection functions, as they can be derived from FIGS. 6a–6d, sensors 11.1, 11.2 and/or 11.3 of the arrangements in accordance with the invention can also take over further functions. Some examples are cited in the following sections.

The light intensity, which is measured by sensor 11.2, when the light beam is not disturbed by any edge and any object, is (if necessary as momentary average value) utilized for the adaptation of threshold values for sensors 11.2 or also 11.1/11.3 to momentary light conditions (such as, e.g., local dirt contamination of the carrier T). It becomes manifest that, in particular for the detection of leading edges of non-transparent objects, threshold values adapted in this manner, which in preference are set to 40–50% of an average intensity, provide very good results.

The signals of the sensors 11.1 and/or 11.3, when no edge is to be detected, are utilized for the determination of an average secondary light intensity. The average secondary light intensity can also be utilized for the adaptation of threshold values.

For edge detection of cases b, c and, in particular, d (FIGS. 5b–5d, and 6b–6d), it is advantageous to check the signal of the sensor 11.2 for a permanent predefined intensity reduction during a control interval $t_K$ after (for leading edges) or before (for trailing edges) an edge detection. By the inclusion of such a control interval $t_K$ in the signal analysis, the edges of objects, for which the reduction remains in place during the control interval, can be differentiated from scratches or isolated dirt on the carrier or from transparent objects, for which the reduction disappears again very rapidly.

Cracks, cuts or sharp scratches in the transparent carrier or transparent object can be differentiated from edges by the fact that such defects generate an intensity increase in the sensors 11.1 and 11.3, while edges of transparent objects generate an intensity increase only in one of the two sensors. For a differentiation like this, therefore also in the detection of, for example, only leading edges, the signals of both sensors 11.1 and 11.3 have to be included in the analysis.

Figure 7:
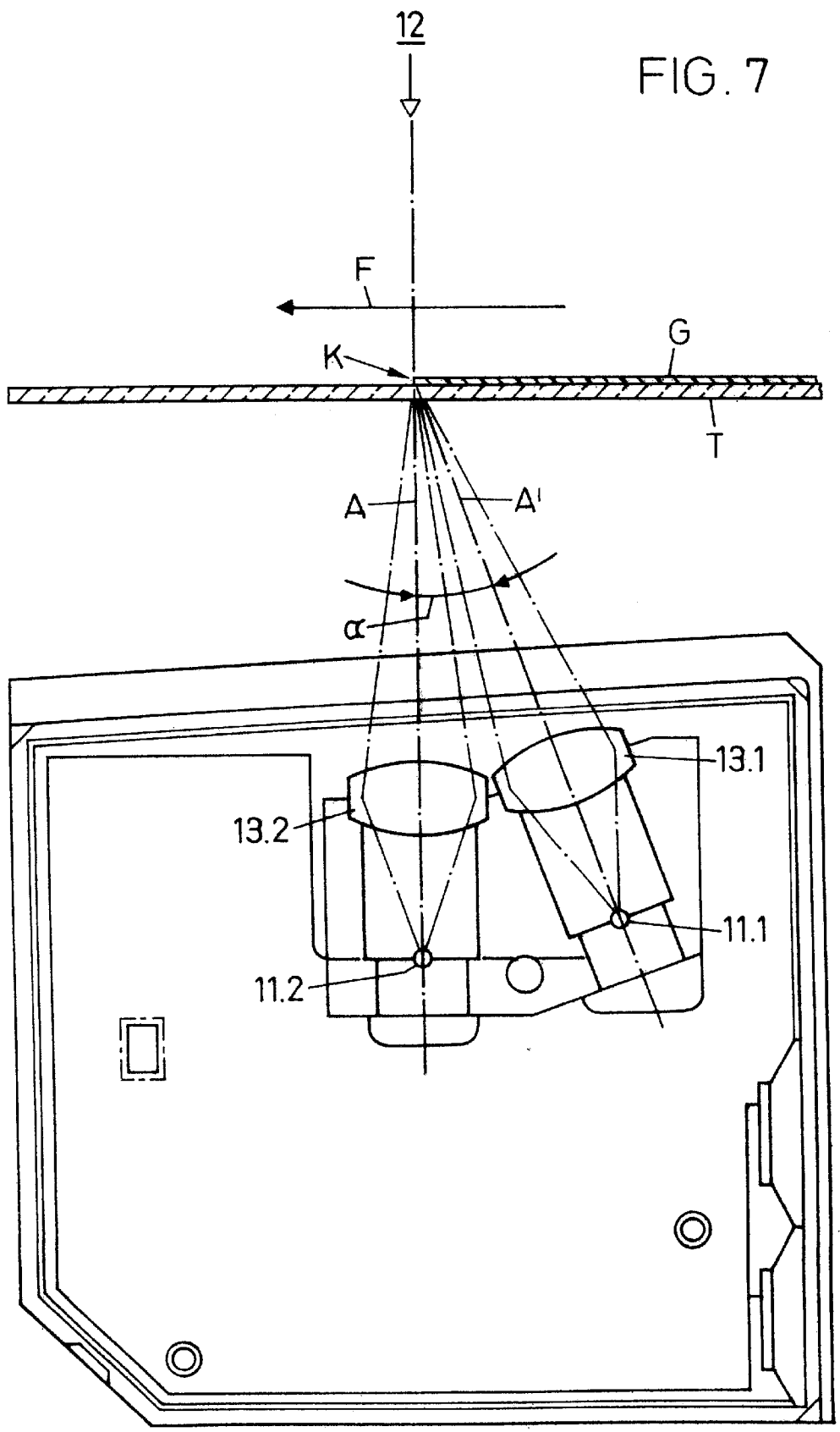
FIG. 7 shows a preferred embodiment of the device in accordance with the invention with two sensors for detecting leading or trailing edges of transparent foils and/or paper sheets, which are moved through the light beam on a transparent carrier.

FIG. 7 shows an arrangement for the detection of edges K of thin objects G, such as sheets of paper or transparent foils, which are sequentially guided on a transparent carrier T. The carrier T moves with the sheets of paper or transparent foils such that the edges to be detected pass through the detection position in an alignment, which is always the same. The device is designed for the detection of leading edges of transparent objects, if the direction of movement is F as depicted. Trailing edges are detected, if the direction of movement is the opposite one. The device illustrated is suitable for use ahead of a printing station, in which individual sheets or foils are printed. The detection signals generated can be utilized for controlling the printing process such that the sheets or foils are printed on in an exactly predefined position.

The device is depicted at a scale of approximately 2.5:1 and in essence has the same components, which have already been described in connection with the FIGS. 1 and 2. The device has a sensor 11.2 aligned with the beam axis A and a sensor 11.1 deflected from the beam axis by 20°. The sensors are photodiodes while the light source (not illustrated) is a laser diode with beam shaping.

It becomes manifest that with the depicted device and with a laser beam, which is focused on the carrier surface to a laser line with a width of maximum 40 μm and a length of about 2 mm, it is possible to position cleanly cut edges of sheets of paper with a reproducibility of less than 10 μm. For cleanly cut edges of transparent foils, the reproducibility is better than 20 μm.

It also becomes manifest that scratches or tears in the carrier and in the foils, which are not aligned parallel to the laser line and, therefore, are also not parallel to the edges to be detected, do not interfere with the measurement at all. For the elimination of interference by scratches or tears parallel to the laser line, see above.

For other applications than those mentioned above, suitable light sources, suitable focusing of the light beam and suitable sensor arrangements have to be determined by experiment. For all applications, threshold values for the edge detection have to be determined experimentally, for example, by static measurements of the optical intensities on an edge positioned at the detection position.

Figure 8:
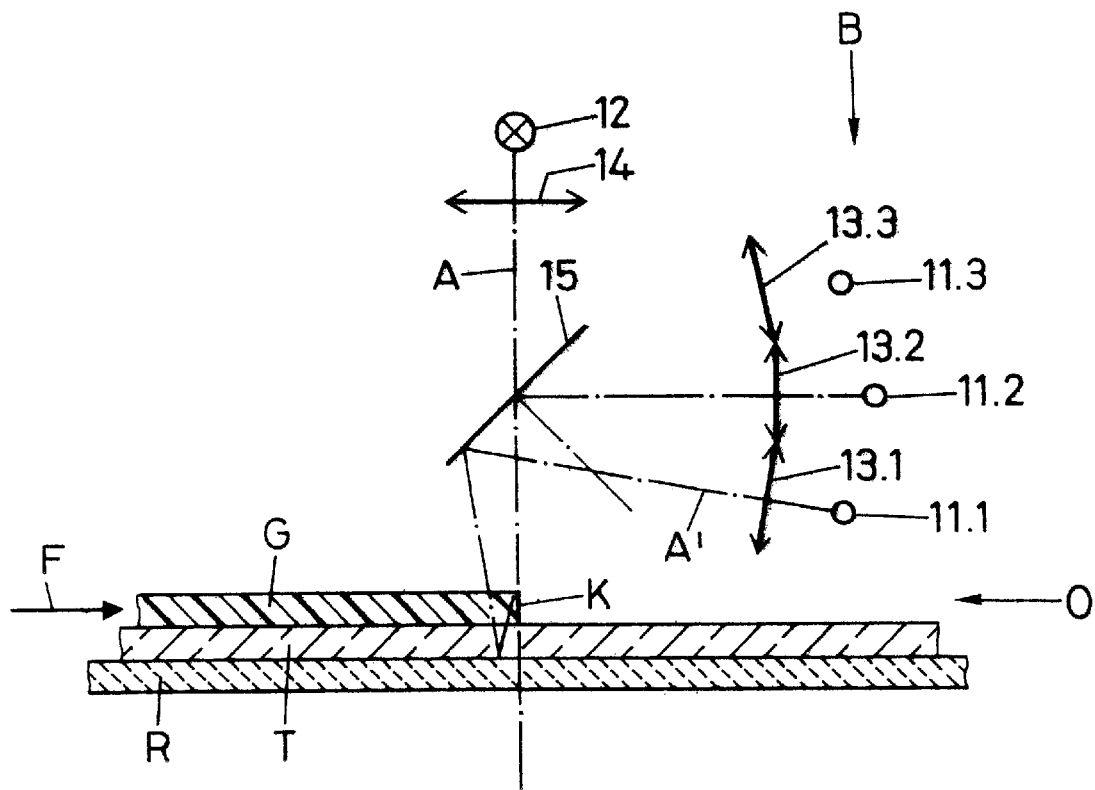
FIG. 8 shows a further preferred embodiment of the device in accordance with the invention.

In FIG. 8, a further embodiment of the device in accordance with the invention is schematically illustrated. It is similar to that of FIG. 4, for which reason the same reference marks are utilized and not further explained here. The difference consists in the fact that in the embodiment of FIG. 8 a reflector R is positioned underneath the object G. The reflector is, for example, a mirror or a reflective foil. In another embodiment, the reflector R can simultaneously serve a carrier T for the object G. The light is reflected at the reflector R, for example, deflected by a beam splitter 15 and impinges on the sensors 11.1–11.3. The beam splitter 15 can also be made do without; the sensors are then arranged in the direction of the light source 12. While in FIG. 8, the carrier T lies directly on the reflector R, in another, not illustrated embodiment, carrier T and reflector R could be arranged at a distance from one another.

What is claimed is:

1. A method for detecting a position of edges of objects, comprising the steps of:

providing an object plane for said objects whose edges are to be detected;

creating a light beam having a direction of propagation intersecting said object plane at an angle;

focusing said light beam on said object plane in at least one direction;

unidirectionally moving objects and said light beam relative to one another;

providing a light beam receiving zone;

measuring light intensities at at least one position of said light beam receiving zone, thereby creating at least one light intensity measuring signal;

determining from said at least one light intensity measuring signal a measurement for light diffraction and refraction;

depending on said measurement for diffraction and refraction, determining the position of one of said object edges.

2. The method of claim 1, comprising the further step of measuring light intensities at at least two positions of said light beam intensity receiving zone, and determining said measurement for light diffraction and refraction based upon said measurement at said at least two positions.

3. The method of claim 1, wherein more than one light beam is created.

4. The method of claim 1, wherein said light beam has a line shaped cross section.

5. The method of claim 4, wherein said light beam is focused into a light line in said object plane and wherein said edges to be detected are moved through said light beam such that said edges to be detected run parallel to said light line in said object plane.

6. The method of claim 1, comprising the further steps of analyzing at least two light intensity measuring signals, and generating and further processing detection signals corresponding to results of the analysis.

7. The method of claim 1, comprising the further step of measuring an intensity of non-deflected light.

8. The method of claim 7, comprising the further step of measuring an intensity of deflected light, said deflected light being deflected from said direction of propagation due to at least one of refraction and diffraction at said edge being detected.

9. The method of claim 8, comprising the further step of analyzing said measured deflected light intensities and generating and further processing detection signals corresponding to said analysis results, said analysis including combining at least two simultaneously measured deflected light intensities.

10. The method of claim 9, wherein the analysis of said measured deflected light intensities comprises the steps of comparing, individually or as combinations, said measured intensities with threshold values, said threshold values being selected from the group consisting of constant values and values adapted to optical characteristics of said objects with edges being detected.

11. The method of claim 10, wherein said threshold values are varied based upon measurements of light intensity without interference from the objects.

12. The method of claim 11, wherein measured light intensities during at least one of a control interval before detection of said edge and a control interval after detection of said edge are included in the analysis of said measured intensities.

13. The method of claim 1, wherein said objects are moved through the light on a transparent carrier, that moves together with said objects.

14. The method of claim 1, wherein said objects are moved on a carrier comprising a light reflector, the carrier moving together with said objects.

15. A device for detecting a position of edges of objects, comprising:

a carrier for carrying objects on an object plane, light source means for creating a light beam having a direction of propagation, said light source means being arranged so that the light beam created thereby intersects said object plane at an angle, light focusing means for focusing said light beam on said object plane in at least one direction, conveying means for unidirectionally moving objects and said light beam relative to one another, a light beam receiving zone comprising light intensity measuring means for measuring a light intensity of said light beam, data processing means for evaluating measured light intensities, the data processing means comprising a medium having program code stored thereon, the program code being configured to make the data processing means determine, from said measured light intensity, a measurement of diffraction and refraction and to determine, from said measurement of diffraction and refraction, the position of the edge to be detected.

16. The device of claim 15, wherein said light intensity measuring means is position sensitive for determining a position sensitive light intensity measuring signal.

17. The device of claim 15, wherein the light intensity measuring means comprise at least two photodiodes arranged at a distance from one another.

18. The device of claim 15, wherein said light intensity measuring means comprise an array of photodiodes.

19. The device of claim 15, wherein said light source means comprise a laser.

20. The device of claim 15, wherein the light focusing means comprise means for focusing the light into a light line in the object plane and wherein said means for creating the relative movement are designed such that edges to be detected are essentially aligned parallel to said light line in said object plane.

21. The device of claim 15, wherein said light intensity measuring means comprise at least one sensor arranged to detect light emitted from the light source means in the direction of propagation essentially undisturbed by objects in said object plane and at least one sensor arranged to measure intensities of light deflected by objects in said object plane.

22. The device of claim 15, wherein said light intensity measuring means comprises one sensor arranged in the direction of propagation from the light source means and another sensor arranged on an axis with a deflection angle from the direction of propagation.

23. The device of claim 15, wherein the light intensity measuring means includes focusing means.

24. The device of claim 15, further comprising means for evaluating the analysis of the measured light intensities and for generating and transmitting detection signals.

25. Use of a method for the detecting a position of edges of objects, comprising the steps of:

providing an object plane for objects comprising edges to be detected;

creating a light beam having a direction of propagation intersecting said object plane at an angle;

focusing said light beam on said object plane in at least one direction;

unidirectionally moving objects and said light beam relative to one another;

providing a light beam receiving zone;

measuring light intensities in at least one position of said light beam receiving zone, thereby creating at least one light intensity measuring signal;

determining from said at least one light intensity measuring signal a measure for light diffraction and refraction;

depending on said measure for diffraction and refraction, determining a position of one of said object edges; and, generating control signals for a printing device, to which sheets of at least one of paper and transparent foil are conveyed in series.

* * * * *